Nov. 20, 1951 — H. T. KRAFT — 2,575,878
METHOD OF MAKING MULTIPLE BEAD PNEUMATIC TIRE CASINGS
Original Filed Jan. 26, 1946

INVENTOR
Herman T. Kraft
BY Evans + McCoy
ATTORNEYS

Nov. 20, 1951 H. T. KRAFT 2,575,878
METHOD OF MAKING MULTIPLE BEAD PNEUMATIC TIRE CASINGS
Original Filed Jan. 26, 1946 2 SHEETS—SHEET 2
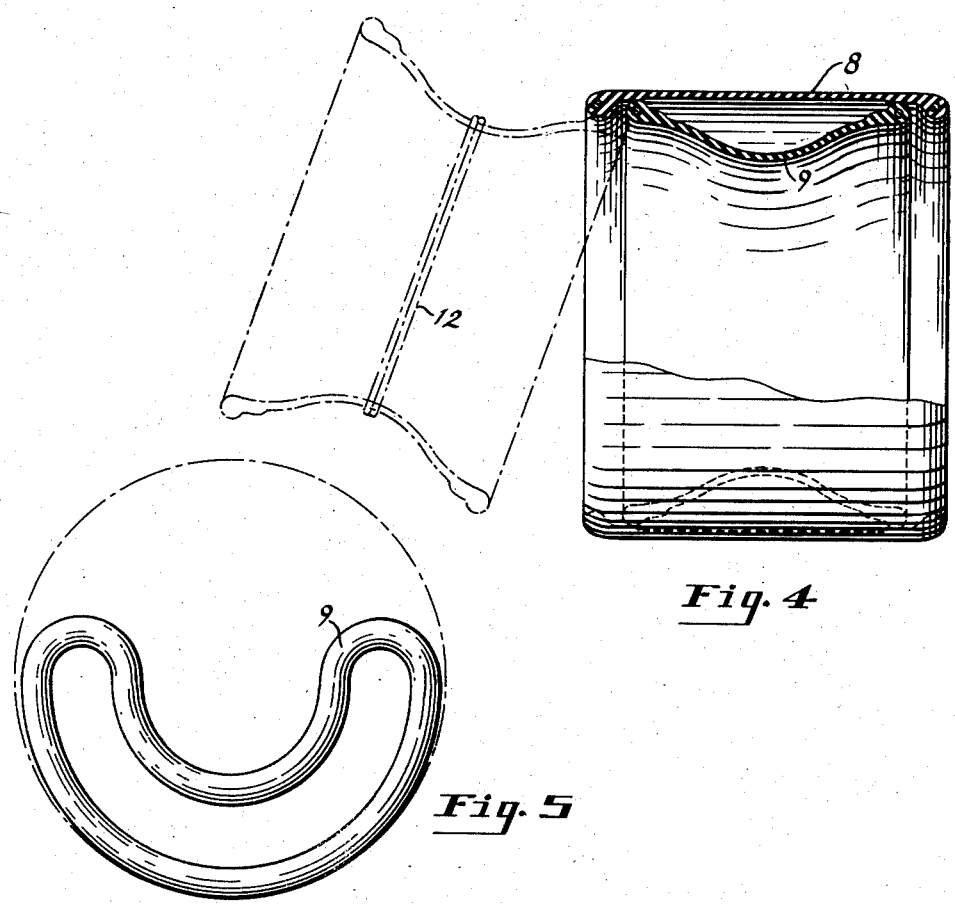
Fig. 4
Fig. 5
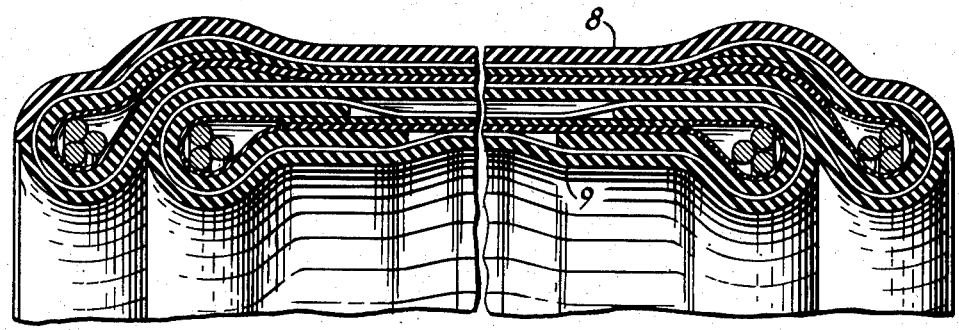
Fig. 6
INVENTOR
Herman T. Kraft
BY Evans + McCoy
ATTORNEYS Patented Nov. 20, 1951

2,575,878

UNITED STATES PATENT OFFICE 2,575,878

METHOD OF MAKING MULTIPLE BEAD PNEUMATIC TIRE CASINGS

Herman T. Kraft, Akron, Ohio, assignor to The General Tire & Rubber Company, Akron, Ohio, a corporation of Ohio Original application January 26, 1946, Serial No. 643,580. Divided and this application January 14, 1950, Serial No. 138,675

3 Claims. (Cl. 154—14)

This invention relates to a method of making multiple bead pneumatic tire casings and is a division of an application of Herman T. Kraft and William C. McCoy, Serial No. 643,580, filed January 26, 1946, now Patent No. 2,501,644, issued March 21, 1950.

The principal objects of the present invention are to facilitate the building of multiple tread tire casings by utilizing a plurality of separately built units that are assembled to form a tire casing and that are each in the form of a ply band with bead rings secured in its end edges; and to so form the separately built units that they can be assembled one within another with the bead rings positioned side by side and then expanded to tire form.

Reference should be had to the accompanying drawings forming a part of this specification in which:

Fig. 4 is a sectional view showing the inner ply band positioned inside of the outer ply band and illustrating one method of assembling the inner ply band within the outer ply band;

Fig. 5 is an end view showing an inner ply band collapsed to a form which will permit it to be inserted into an outer ply band; and Fig. 6 is a fragmentary transverse section showing one of the ply bands assembled within the other.

In building tire casings by the method of the present invention, ply units each comprising a band of suitably reinforced sheet rubber with bead rings built into its end edges are separately built and then placed one within the other with their bead rings side by side to form an assembly which can be expanded to tire form by methods commonly employed for expanding drum built tires from cylindrical to tire form.

Figure 1:
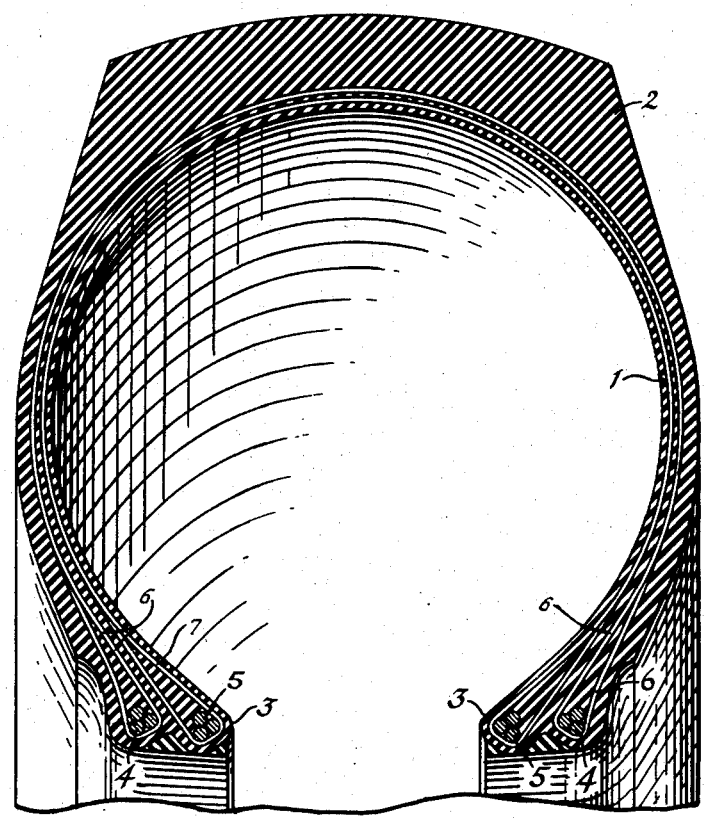
Figure 1 is a transverse section showing a multiple bead tire casing formed by the method of the present invention.
Figure 2:
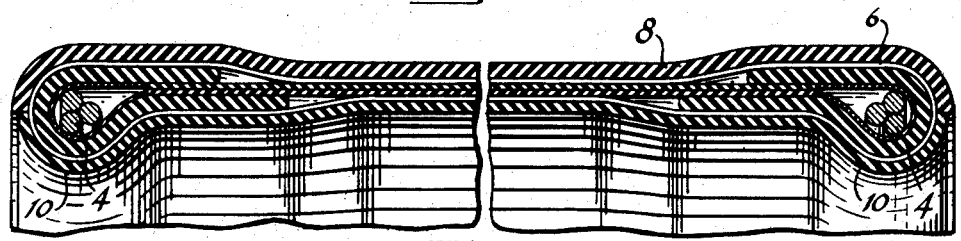
Fig. 2 is a transverse section through one of the separately built ply units employed in the building of the tire.
Figure 3:
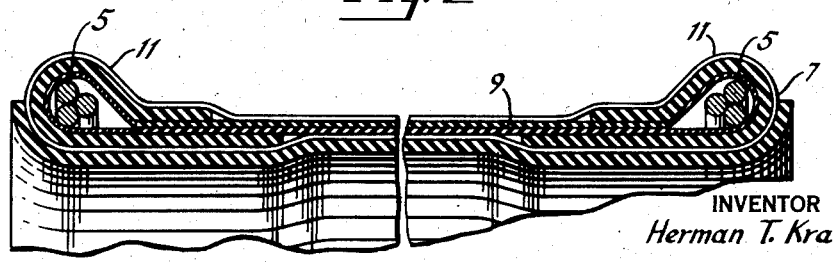
Fig. 3 is a transverse section through the other ply unit employed in the building of the tire.

Figure 1 of the drawings shows a double bead tire casing that can be built by the method of the present invention. As shown in Fig. 1, this tire casing has a side wall 1, a tread portion 2 and bead portions 3 at the inner edges of the side walls. Each bead 3 of the tire has an outer bead ring 4 and an inner bead ring 5. These bead rings which are substantially inextensible, are of the same circumferential length and are positioned side by side in the tire bead 3.

As shown in Fig. 1, reinforcing strands 6 and 7 are looped over the bead rings 4 and 5 and extend through the side walls and tread portion of the tire from bead to bead. These strands may be formed of cabled high tensile steel wire as disclosed in the parent application above referred to. The strands 6 reinforce an outer ply band 8 and the strands 7 reinforce an inner ply band 9. The ply bands 8 and 9 are separately built, the ply band 8 having bead rings 4 built into its opposite edges and the ply band 9 having the bead rings 5 built into its opposite side edges. An edge portion 10 of the ply band 8 enclosing the bead ring 4 projects radially inwardly from the substantially cylindrical body of the band and the edge portion 11 of the inner ply band 9 may project outwardly with respect to the body portion of the band.

For some constructions it may be desirable to stretch the body portion of the outer ply band 8 to a diameter substantially greater than the bead receiving portion of the band. This may be done by engaging the interior of the band with an inflatable rubber tube so supported that it can exert a radial outward pressure on the band when inflated.

To facilitate assembly it may be desirable to contract the center portion of the inner band 9 and this may be done by placing a constricting winding 12 around the center portion of the band 9 which is allowed to remain on the band until the rubber takes a set so that the center portion of the band will remain contracted after removal of the restricting band and during insertion of the inner band into the outer band.

Since the bead rings 4 and 5 are flexible an edge portion of the outer band may be made slightly oval while the inner band 9 is made oval with the long axis of its oval perpendicular to the long axis of the oval of the outer band. This will permit an edge of the inner band to be inserted into the outer band as shown in dotted lines in Fig. 4, after which the inserted end of the inner band may be advanced within the outer band until the bead ring is entirely within the outer band.

After the first bead ring of the inner band is inserted the second bead ring of the inner band may be inserted into the outer band in a similar manner. The inner band is preferably made of slightly less axial length than the outer band, so that the bead rings will lie side by side after assembly of the two bands as shown in Fig. 6.

An alternative method of inserting the inner band into the outer band is illustrated in Fig. 5, which shows the inner band collapsed to a form which will permit it to be inserted endwise into the outer band. After insertion the collapsed band is expanded to its normal shape to position the inner band within the outer band as shown in Fig. 6.

After the two ply bands are assembled the tread stock may be applied to the outer band and the assembled bands may be expanded to tire form by the methods commonly employed to expand cylindrical drum built casings to tire form.

It is to be understood that in accordance with the provisions of the patent statutes, variations and modifications of the specific devices herein shown and described may be made without departing from the spirit of the invention.

What I claim is:

1. The method of making a pneumatic tire from a pair of ply units, each in the form of a band having flexible substantially inextensible bead rings in its edges, one of the bands being of greater axial length than the other and the bead rings of one band being of substantially the same circumferential length as the bead rings of the other, which comprises flexing the bead rings of the shorter band and passing them through a ring of the longer band, positioning the shorter band inside the longer with its bead rings between the bead rings of the longer band and adjacent thereto, and expanding the assembled ply units to tire form.

2. The method of making a pneumatic tire from a pair of ply units, each in the form of a band having flexible substantially inextensible bead rings in its edges, one of the bands having inturned end edges each having a bead ring therein of a circumferential length less than the circumference of the body of the band, the other of the bands being axially shorter and of less circumference than the first and having beads in its edges of substantially the same circumferential length as the beads of the first, which comprises flexing the bead rings of the shorter band and passing them through a ring of the longer band, positioning the shorter band inside the longer with the bead rings thereof between the bead rings of the longer band and adjacent thereto, and expanding the assembled ply units to tire form.

3. The method of making a pneumatic tire from a pair of ply units, each in the form of a band having flexible substantially inextensible bead rings in its edges, the bead rings of one band being of substantially the same circumferential length as the bead rings of the other, which comprises flexing the bead rings of one band, passing them through one of the rings of the other band, positioning the bead rings of the two bands side by side, and expanding the assembled ply units to tire form.

HERMAN T. KRAFT.

REFERENCES CITED

The following references are of record in the file of this patent:

UNITED STATES PATENTS

| Number | Name | Date |
| --- | --- | --- |
| 1,989,956 | Ulrich | Feb. 5, 1935 |
| 2,451,973 | Purdy | Oct. 19, 1948 |
| 2,480,811 | McCoy | Aug. 30, 1949 |